US012801098B2

(12) United States Patent
Madasu

(10) Patent No.: US 12,801,098 B2
(45) Date of Patent: Nov. 17, 2026

(54) UTILITY USAGE PREDICTION AND OPTIMIZATION

(71) Applicant: International Business Machines Corporation, Armonk, NY (US)

(72) Inventor: Srinath Madasu, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 18/465,413

(22) Filed: Sep. 12, 2023

(65) Prior Publication Data

US 2025/0085673 A1 Mar. 13, 2025

(51) Int. Cl.
*G05B 13/02* (2006.01)
*G06Q 50/06* (2012.01)

(52) U.S. Cl.
CPC ........... *G05B 13/027* (2013.01); *G06Q 50/06* (2013.01); *G06Q 2220/10* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

2015/0181047 A1* 6/2015 Zalmanovitch ......... H04W 4/70 455/406
2020/0019841 A1* 1/2020 Shaabana ................ G06F 9/505
2021/0027144 A1 1/2021 Madasu et al.
2022/0004902 A1* 1/2022 Alhelo ..................... G06N 5/04
2023/0177327 A1* 6/2023 Pillai ....................... G06F 30/27 706/25
2024/0345558 A1* 10/2024 Davis, II .............. G05B 19/042
2024/0346389 A1* 10/2024 Pan ........................ G06N 3/045
2024/0405548 A1* 12/2024 Mimaroglu ............ G06Q 50/06

FOREIGN PATENT DOCUMENTS

CN 113515882 A 10/2021
CN 114282448 A 4/2022
CN 114580611 A 6/2022
CN 115542415 A 12/2022
(Continued)

OTHER PUBLICATIONS

Berner, "Quantum Bayesian Neural Networks", https://github.com/NoahBerner/quantum_bayesian_neural_networks, 2021, 1 page.
(Continued)

*Primary Examiner* — Hung D Le
(74) *Attorney, Agent, or Firm* — Cantor Colburn LLP; Rakesh Roy

(57) ABSTRACT

Techniques are provided for utility usage prediction and optimization. In one embodiment, the techniques involve receiving user data, receiving utility data, generating, via a trained physics-informed neural network (PINN), a utility usage prediction based on the utility data, generating a utility plan based on the user data and the utility usage prediction, wherein the utility plan includes limits or restrictions of a utility usage, and controlling the utility usage based on the utility plan.

20 Claims, 5 Drawing Sheets

500

(56) References Cited

FOREIGN PATENT DOCUMENTS

| | | |
|---|---|---|
| CN | 115641423 A | 1/2023 |
| CN | 116118724 A | 5/2023 |

OTHER PUBLICATIONS

Blank, et al., "Quantum-enhanced analysis of discrete stochastic processes", Nature Partner Journals (NPJ), Quantum Information, https://www.nature.com/articles/s41534-021-00459-2, 2021, 9 pages.
Dong, et al., "Hourly energy consumption prediction of an office building based on ensemble learning and energy consumption pattern classification", https://www.sciencedirect.com/science/article/abs/pii/S0378778821002139, Elsevier, 2021, 15 pages.
El Mokadem, et al., "Federated Learning for Energy Constrained IoT devices: A systematic mapping study", Telecommunications Systems, Networks and Services Lab, National Institute of Posts and Telecommunications, Rabat, Morocco, 27 pages.
Heden, "Predicting Hourly Residential Energy Consumption using Random Forest and Support Vector Regression", https://www.diva-portal.org/smash/get/diva2:932582/FULLTEXT01.pdf, KTH Royal Institute of Technology, School of Engineering Sciences, 74 pages.
IBM Watson SDK for Unity, https://github.com/watson-developer-cloud/unity-sdk, (Retrieved Jul. 10, 2023), 21 pages.
Oh, et al., "A Physical Model-Based Data-Driven Approach to Overcome Data Scarcity and Predict Building Energy Consumption", Sustainability, 2022, 14 pages.
Petrangeli, et al., "Performance Evaluation of Federated Learning for Residential Energy Forecasting", IoT, 2022, 17 pages.
Soon, et al., "Predicting energy demand with neural networks", https://towardsdatascience.com/forecasting-energy-consumption-using-neural-networks-xgboost-2032b6e6f7e2, (Retrieved: Jul. 10, 2023), 2020, 27 pages.
Truong, et al., "Accurate Prediction of Hourly Energy Consumption in a Residential Building Based on the Occupancy Rate Using Machine Learning Approaches", https://pdfs.semanticscholar.org/b06f/b34cd6ca808a4ae2015061915699a638b3f0.pdf, 2021, 19 pages.
Wang, "A Quantum Approximate Bayesian Optimization Algorithm for Continuous Problems", https://www.proquest.com/openview/ee214891c87187f0afb7b7660e00ebce/1?pq-origsite=gscholar&cbl=51908, Proceedings of the 2021 IISE Annual Conference, 2021, 1 page.
Whyte, et al., "Quantum Annealing Optimization of a Heuristic Surrogate Model For PWR Fuel Loading", EPJ Web of Conferences, https://ui.adsabs.harvard.edu/abs/2021EPJWC24706028W/abstract, 2021, 8 pages.
Zhao, et al., "Cluster-driven Personalized Federated Learning for Natural Gas Load Forecasting", Digital Research Institute, ENN Group, China, 7 pages.
Zhou, et al., "Joint Optimization of Energy Consumption and Completion Time in Federated Learning", arXiv preprint, 2023, 13 pages.

* cited by examiner

200

UTILITY USAGE PREDICTION AND OPTIMIZATION

BACKGROUND

The present disclosure relates to utility consumption, and more specifically, to predicting and optimizing utility consumption using physics-informed neural networks (PINNs).

Traditional utility usage measurement techniques involve detecting utilities (e.g., natural gas, electricity, or water) usage via metering equipment installed at a location of the utility usage. Smart meters are used to record utility usage in real-time, and utility providers can use the records to profile the utility usage. The profile can include historical utility usage data such as times when a utility is used, average temperatures of thermostats, or the types of electrical appliances used. The historical utility usage data may be used to predict future utility usage, and to optimize a real-time utility usage. However, such predictions and optimizations are often inaccurate.

SUMMARY

A method is provided according to one embodiment of the present disclosure. The method includes receiving user data; receiving utility data; generating, via a trained physics-informed neural network (PINN), a utility usage prediction based on the utility data; generating a utility plan based on the user data and the utility usage prediction, wherein the utility plan includes limits or restrictions of a utility usage; and controlling the utility usage based on the utility plan.

A system is provided according to one embodiment of the present disclosure. The system includes a processor; and memory or storage comprising an algorithm or computer instructions, which when executed by the processor, performs an operation that includes: receiving user data; receiving utility data; generating, via a trained physics-informed neural network (PINN), a utility usage prediction based on the utility data; generating a utility plan based on the user data and the utility usage prediction, wherein the utility plan includes limits or restrictions of a utility usage; and controlling the utility usage based on the utility plan.

A computer-readable storage medium having computer-readable program code embodied therewith, the computer-readable program code executable by one or more computer processors to perform an operation, is provided according to one embodiment of the present disclosure. The operation includes receiving user data; receiving utility data; generating, via a trained physics-informed neural network (PINN), a utility usage prediction based on the utility data; generating a utility plan based on the user data and the utility usage prediction, wherein the utility plan includes limits or restrictions of a utility usage; and controlling the utility usage based on the utility plan.

DETAILED DESCRIPTION

Figure 1:
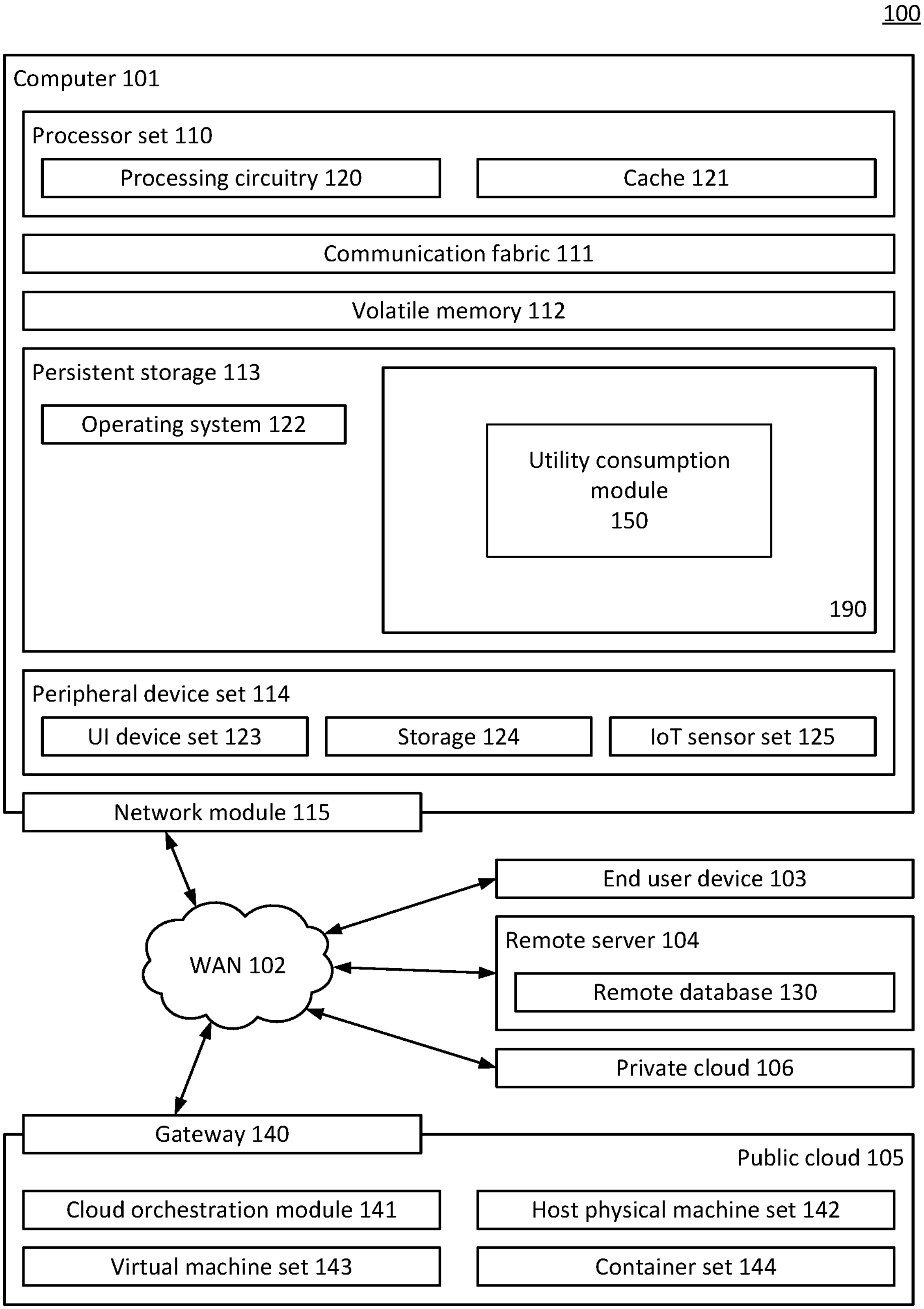
FIG. 1 illustrates a computing environment, according to one embodiment.

As used herein, the term "physics-informed neural network" or "PINN" can refer to a PINN model that is a member of a federated learning network. In one embodiment, local PINNs receive federated time series utility data from distributed or decentralized data sources such as utility systems, weather systems, metering systems, or the like. The utility data can be used to train the local PINNs, and the trained local PINN models can be used to train a global PINN (in lieu of training using the utility data). In this manner, the local PINNs can collectively contribute to training the global PINN, while maintaining privacy of the utility data.

Embodiments of the present disclosure improve upon utility usage prediction and optimization techniques by providing a utility consumption (UC) module that generates accurate predictions and optimizations via the local or global PINNs. In one embodiment, when the utility data includes incomplete or extrapolated data, the UC module uses one of the local PINNs or the global PINN to predict a utility usage, and uses the predicted utility usage to generate an optimized utility plan. The utility plan can include limits or restrictions on utility usage during specific time windows, or at a given times of the day. In one embodiment, the limits or restrictions of the utility plan minimize utility consumption while meeting a utility demand determined from the utility usage prediction. In one embodiment, the UC module controls a distributed optimization system where a given local environment uses a respective local PINN (or the global PINN), and a respective optimized utility plan, to optimize a utility use of a user of the local environment.

One benefit of the disclosed embodiments is to increase the accuracy of utility usage predictions, and plan optimizations, by providing a robust PINN network that accounts for incomplete or extrapolated utility data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as new utility consumption module 150, shown in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
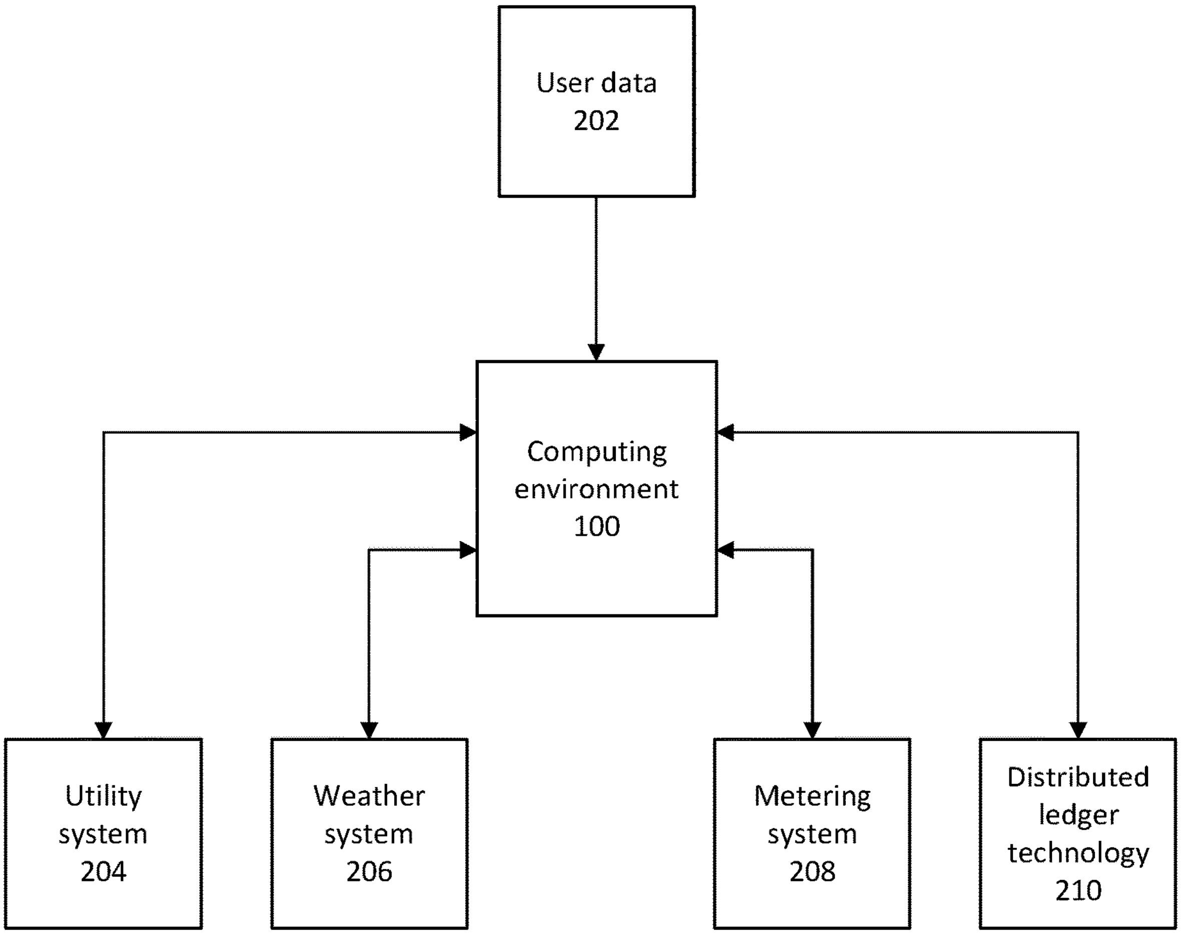
FIG. 2 illustrates a utility usage environment, according to one embodiment.
Figure 3:
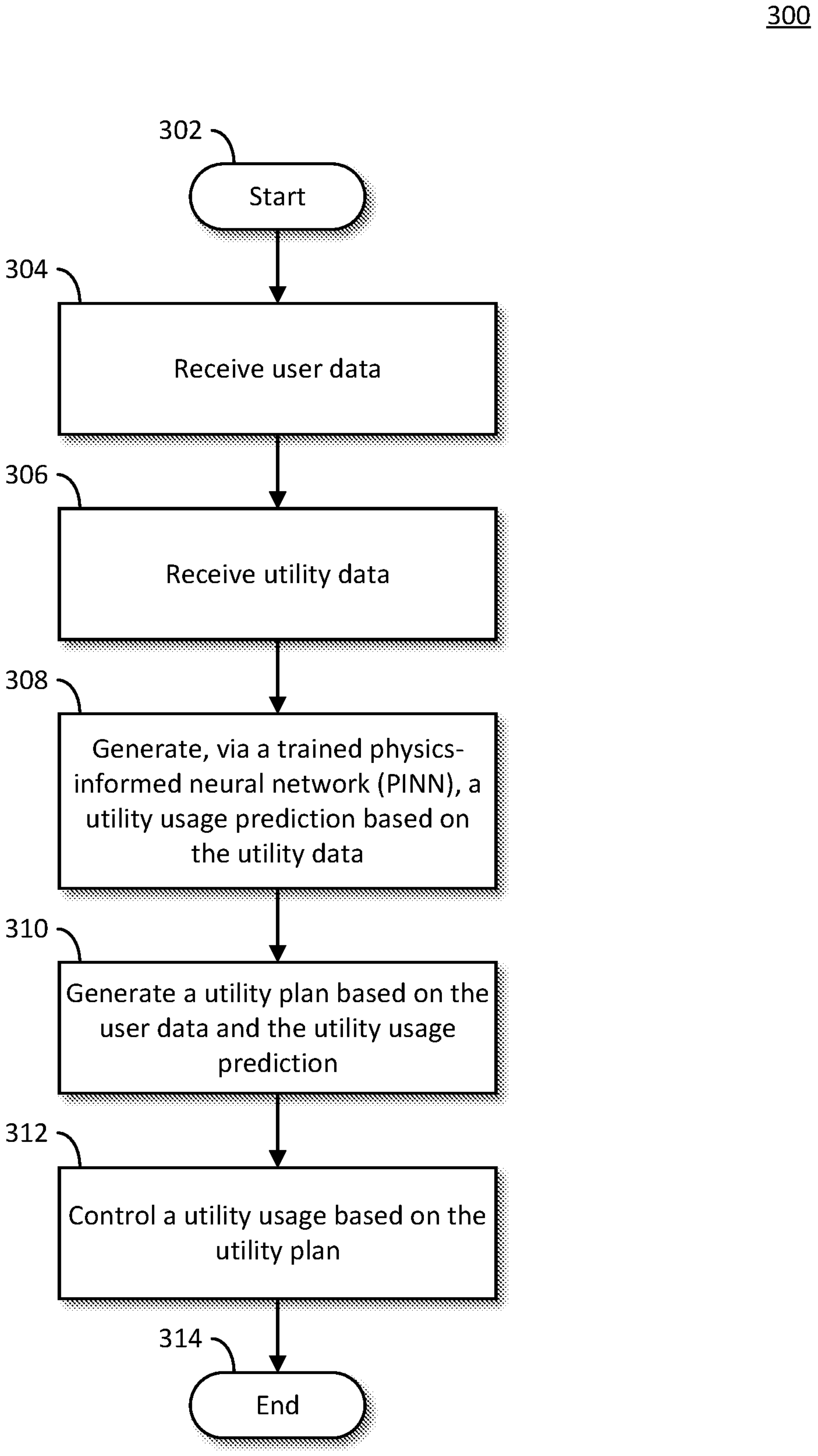
FIG. 3 illustrates a flowchart of a method of controlling a utility usage based on a utility plan generated via a trained physics-informed neural network, according to one embodiment.

FIG. 2 illustrates a utility usage environment 200, according to one embodiment. FIG. 3 illustrates a flowchart of a method 300 of controlling a utility usage based on a utility plan generated via a trained physics-informed neural network, according to one embodiment. FIG. 2 is described in conjunction with FIG. 3.

In the embodiment illustrated in FIG. 2, the utility usage environment 200 includes a computing environment 100, user data 202, a utility system 204, a weather system 206, a metering system 208, and a distributed ledger technology 210. As previously discussed, the computing environment 100 includes persistent storage 113, which includes a utility consumption (UC) module 150. In one embodiment, the UC module 150 represents one or more algorithms, instruction sets, software applications, or other computer-readable program code that can be executed by the processor set 110 to perform the functions, operations, or processes described herein.

In one embodiment, the user data 202 is transferred to the UC module 150 via the end user device 103 of the computing environment 100. The utility system 204, the weather system 206, the metering system 208, and the distributed ledger technology 210 can be communicatively coupled to the computing environment 100 via the WAN 102.

One method 300 of controlling a utility usage based on a utility plan generated via a trained physics-informed neural network (PINN) begins at block 302. At block 304, the UC module 150 receives the user data 202. The user data 202 can include a utility budget, a utility usage analytics request, a utility usage prediction request, an optimized utility plan request, or the like.

At block 306, the UC module 150 receives utility data. In one embodiment, the utility data includes data from the utility system 204, the weather system 206, or the metering system 208. The utility system 204 can provide utilities such as water, electricity, natural gas, or the like, to a building, city, or area.

The weather system 206 can include a weather monitoring equipment, or meteorological instruments, that measures environmental conditions (e.g., temperature, humidity, precipitation, or the like) at various locations. The data measured by the weather system 206 may include environmental conditions that can affect the use of the utility system 204. For instance, higher temperatures in an area where the user is located may be correlated with higher electricity consumption due an electrical HVAC system of the user.

The metering system 208 can include analog or smart meters that measure utility usage of the utility system 204. The metering system 208 may include gas meters, water meters, electricity meters, or the like. The data measured by the metering system 208 can be used for billing, analytics, resource management, or the like.

At block 308, the UC module 150 generates, via a trained physics-informed neural network, a utility usage prediction based on the utility data. This process is described in FIGS. 4-5.

At block 310, the UC module 150 generates a utility plan based on the user data 202 and the utility usage prediction. The utility plan can include limits or restrictions on utility usage during specific time windows, or at a given times of the day. In one embodiment, the UC module 150 optimizes the utility plan to minimize utility consumption while meeting a utility demand determined from the utility usage prediction.

For example, the utility plan may be optimized to reflect a work schedule of the user. Hence, the utility plan may allow for a maximum electricity usage of 0.3 KWH between 9 am-5 pm (when the user is in an office away from home), and allow for a maximum electricity usage of 0.5 KWH between 5 pm-9 pm (when the user is at home). By following the utility plan, the user can ensure minimal utility usage, while still minimizing inconvenience to the user.

The UC module 150 can further optimize the utility plan to remain within monetary constraints of a budget included in the user data 202. For instance, the utility plan may be optimized to further reduce the maximum electricity usage of between 5 pm-9 pm to 0.4 KWH due to maximum electricity bill set by the user.

At block 312, the UC module 150 controls the utility usage based on the utility plan. In one embodiment, the UC module 150 limits or restricts usage of a utility by the user by controlling access to the utility when the usage approaches or exceeds a usage limit or restriction of the utility plan. For instance, as an electricity usage rate of the user approaches a limit of the utility plan, the UC module 150 can reduce the electricity usage rate of the user by restricting current flow to devices of the user. Further, when the electricity usage rate of the user exceeds a limit of the utility plan, the UC module 150 can prevent or remove access to the utilities by the user by preventing current flow to the devices.

The UC module 150 can also transfer the utility plan to the user via the end user device 103. Further, the UC module 150 can receive user payments via the end user device 103, and invoke a smart contract on the distributed ledger technology to record the user payments. The method 300 ends at block 312.

Figure 4:
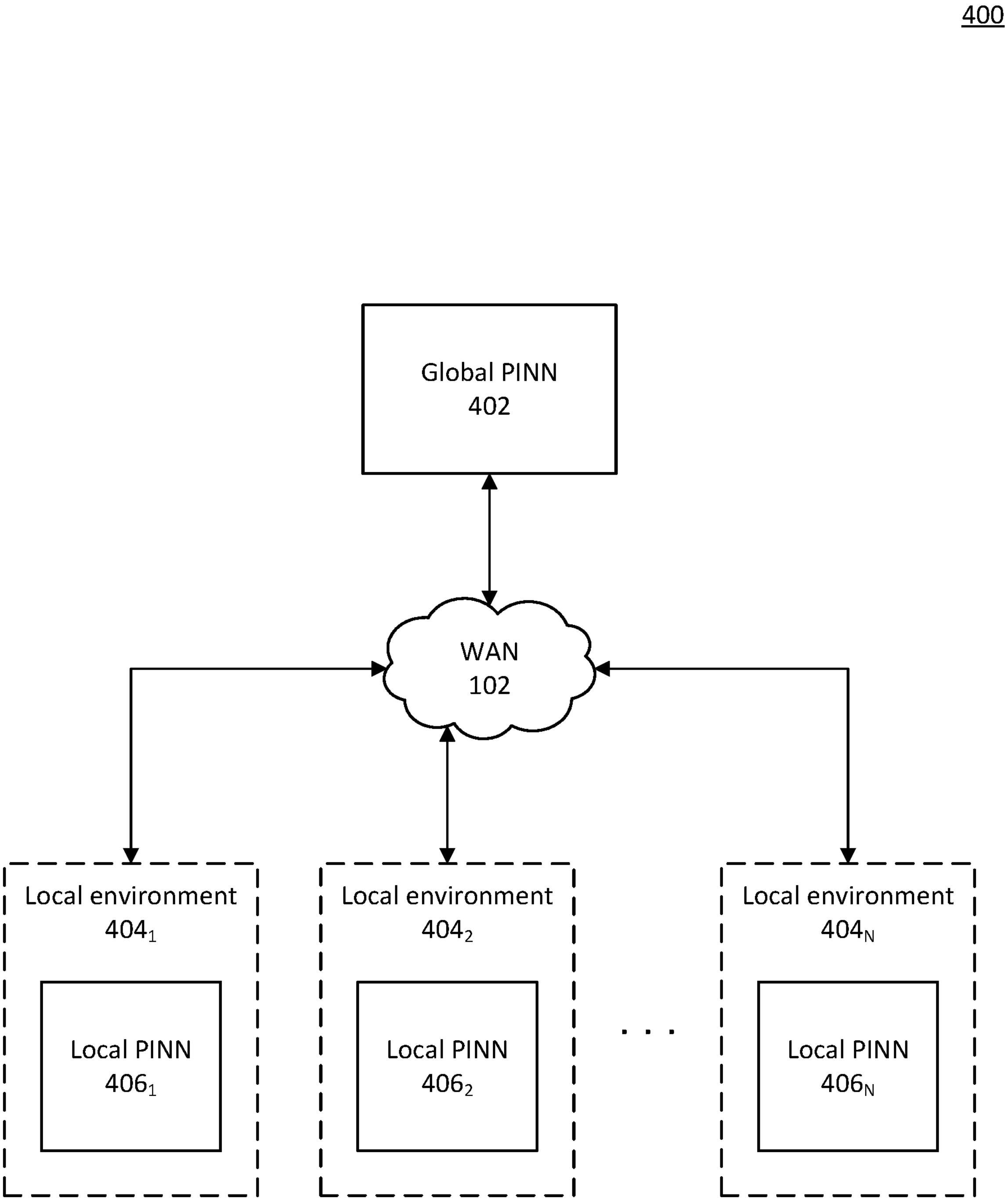
FIG. 4 illustrates a physics-informed neural network training environment, according to one embodiment.
Figure 5:
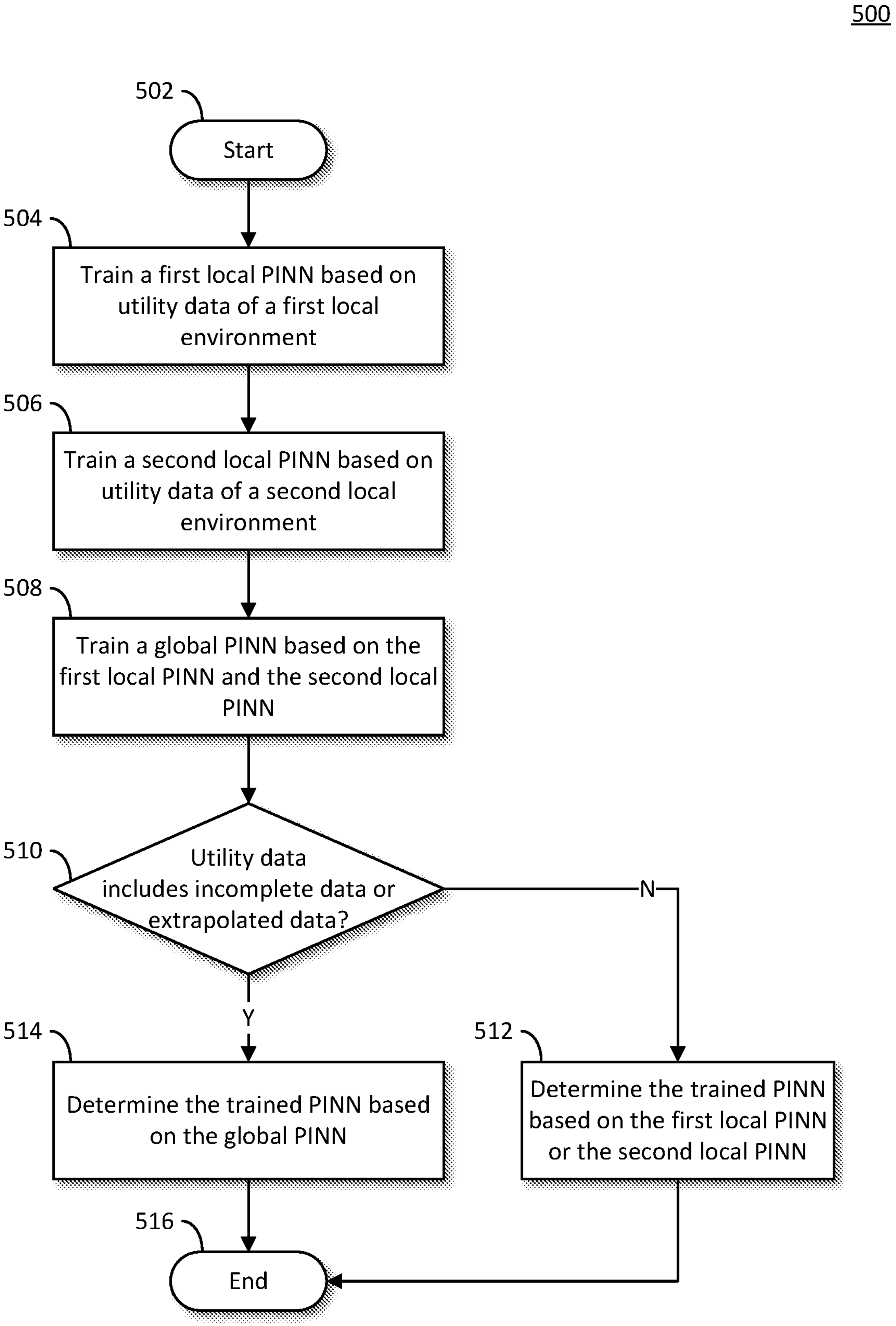
FIG. 5 illustrates a flowchart of a method of training a physics-informed neural network, according to one embodiment.

FIG. 4 illustrates a physics-informed neural network training environment 400, according to one embodiment. FIG. 5 illustrates a flowchart of a method 500 of training a physics-informed neural network, according to one embodiment. FIG. 4 is described in conjunction with FIG. 5.

In the embodiment illustrated in FIG. 4, the physics-informed neural network (PINN) training environment 400 includes a global PINN 402, the WAN 102 of the computing environment 100, local environments $\mathbf{404}_{1\text{-}N}$, and local PINNs $\mathbf{406}_{1\text{-}N}$. The global PINN 402 can be generated based on the local PINNs $\mathbf{406}_{1\text{-}N}$, which can each generate predictions of the utility data of the corresponding local environments $\mathbf{404}_{1\text{-}N}$. The local environments $\mathbf{404}_{1\text{-}N}$ can include a building, an area or a region, a city, or the like, that can result in utility data that differs from the utility data produced in another local environment.

In one embodiment, a PINN is a machine learning model with an artificial neural network structure that includes a specialized loss function. The loss function can include a physics component and a data component. The physics component can include a physics equation (e.g., a partial differential equation (PDE) of a physics formula), and boundary conditions of the physics equation. The data component can include observed data (e.g., utility data) and data predictions of the PINN. The loss function can be used to generate gradients that are then used to update weights of the neural network to train the PINN. In this manner, the PINNs can be trained to predict future utility usage of the user.

One method 500 of training a PINN begins at block 302. Although explanations of embodiments of the method 500 may describe a limited set of the local environments $\mathbf{404}_{1\text{-}N}$ and the local PINNs $\mathbf{406}_{1\text{-}N}$, the method 500 may be applied to any combination of the local environments $\mathbf{404}_{1\text{-}N}$ and the corresponding local PINNs $\mathbf{406}_{1\text{-}N}$.

At block 504, a utility consumption (UC) module 150 trains a first local PINN of the local PINNs $\mathbf{406}_{1\text{-}N}$ based on utility data of a first local environment of the local environments $\mathbf{404}_{1\text{-}N}$. As previously discussed, the utility data can include data from the utility system 204, the weather system 206, or the metering system 208.

As a non-limiting example, the first local environment can be a region that includes a building occupied by the user. Heating and cooling of the building can be handled by an electrical HVAC system. The loss function of the first local PINN may include the conservation of mass continuity equation ($\partial\rho/\partial t+\nabla\cdot(\rho\cdot V)=0$), where ρ represents an air density, t represents time, ∇ represents a gradient operator, and V represents a wind vector. This PDE can describe the conservation of mass in air or in a fluid, which can be used to describe the movement of air and fluid in the atmosphere, which can affect the temperatures experienced in first local environment. The loss function can also include utility data of a range of temperatures measured in the first local environment, and predictions of the utility data by the first local PINN. The first local PINN can be trained by generating gradients of the loss function, updating the weights of the neurons of the first local PINN, generating a new loss function, and repeating the process until a difference between the predicted utility data and the measured utility data is within a desired range. In this manner, the first local PINN can be trained to generate predictions of the utility data that are consistent with the conservation of mass continuity equation as applied to the first local environment.

At block 506, the UC module 150 trains a second local PINN of the local PINNs $\mathbf{406}_{1\text{-}N}$ based on utility data of a second local environment of the local environments $\mathbf{404}_{1\text{-}N}$. The second local PINN can be trained using a process similar to the process used to train the first local PINN.

At block 508, the UC module 150 trains a global PINN 402 based on the first local PINN and the second local PINN. In one embodiment, the global PINN 402 is trained using a weighted average of the local PINNs $\mathbf{406}_{1\text{-}N}$, such that $$\text{Global}_{LOSS} = \text{Physics}_{PDE} + \sum_{i=1}^{N} \overline{w}(i) * \text{Local}_{LOSS}(i),$$

where $\text{Global}_{LOSS}$ represents a loss function of the global PINN 402, $\text{Physics}_{PDE}$ represents a physics partial differential equation, $\overline{w}$(i) represents a weighted average of the $i^{th}$ PINN of the local PINNs $\mathbf{406}_{1\text{-}N}$, and $\text{Local}_{LOSS}$(i) represents a loss function of the $i^{th}$ PINN of the local PINNs $\mathbf{406}_{1\text{-}N}$.

At block 510, the UC module 150 determines whether the utility data includes incomplete data or extrapolated data. In one embodiment, incomplete data refers to missing data of the utility data. For instance, the utility data may be missing a range of temperatures due to defective metering systems, due to inclement weather that damaged measurement records, due to power outages that prevent communications between the weather system and the UC module 150, or the like.

The extrapolated data can include data generated by a local PINN to replace incomplete data of the corresponding local environment. For instance, after being trained, the first local PINN $\mathbf{406}_1$ can generate utility data that is likely to be similar to missing electricity usage data due to a faulty electrical meter. The local PINN may use the generated data in place of the missing data.

Upon determining that the utility data does not include incomplete or extrapolated data, the method 500 proceeds to block 512. At block 512, the UC module 150 determines a trained PINN based on the first local PINN or the second local PINN. As previously discussed at block 308 of FIG. 3, the trained PINN can be used to generate a utility usage prediction, which the UC module 150 can use to generate an optimized utility plan.

In one embodiment, when the utility data does not include incomplete or extrapolated data, a local PINN that includes the complete utility data is deemed to be the most efficient PINN to use as the trained PINN. Put differently, a local PINN that is trained on complete utility data of a corresponding local environment is the most likely PINN to generate an accurate prediction of future utility usage of the corresponding local environment. Further, computational resources may be saved by using the local PINN, as opposed to training or using the global PINN 402. The method 500 then proceeds to block 516, where the method 500 ends.

Returning to block 510, upon determining that the utility data does include incomplete or extrapolated data, the method 500 proceeds to block 514. At block 514, the UC module 150 determines a trained PINN based on the global PINN 402.

In one embodiment, when the utility data that was used to train the local PINN includes incomplete or extrapolated data, use of the global PINN 402 is more likely to generate an accurate prediction of future utility usage of the local environment corresponding to the local PINN. Put differently, the global PINN 402 is a more robust model that is trained using data from multiple local PINNs (including the local PINN that includes incomplete or extrapolated data). Hence, the correlations learned from the combination of the local PINNs is likely to produce a more accurate prediction of future utility usage in comparison to the local PINN that includes incomplete or extrapolated utility data.

For example, the utility data of a first local PINN may be missing a range of temperatures of the first local environment. Hence, predictions of a future use of an electrical HVAC system, which is reliant on the measured temperatures of the local environment, may be sub-optimal. However, the utility data of a second local PINN of a nearby second local environment may include the range of temperatures missing from the utility data of the first local PINN. Hence, the global PINN 402, which is trained using each of the local PINNs, may be able to accurately generate predictions of the missing range of temperatures, and determine how the temperatures would affect electricity usage due to the HVAC system. Therefore, the global PINN 402 may be able to generate a more accurate prediction of future utility usage in the first local environment. The method 500 ends at block 516.

While the foregoing is directed to embodiments of the present invention, other and further embodiments of the invention may be devised without departing from the basic scope thereof, and the scope thereof is determined by the claims that follow.

What is claimed is:

1. A method comprising:
receiving user data;
receiving utility data;

generating, via a trained physics-informed neural network (PINN), a utility usage prediction based on the utility data, wherein training the trained PINN comprises:

training a first local PINN based on utility data of a first local environment;

training a second local PINN based on utility data of a second local environment; and training a global PINN based on the first local PINN and the second local PINN;

generating a utility plan based on the user data and the utility usage prediction, wherein the utility plan includes limits or restrictions of a utility usage; and controlling the utility usage of at least one of electricity, water, or gas based on the utility plan.

2. The method of claim 1, wherein the user data includes at least one of: a utility budget, a utility usage analytics request, a utility usage prediction request, or an optimized utility plan request;

wherein the utility data includes data from a utility system, a weather system, or a metering system;

wherein the limits or restrictions of the utility plan indicate the utility usage during a time window or during a given time of a day; and wherein the limits or restrictions of the utility plan indicate the utility usage in compliance with the utility budget.

3. The method of claim 1, further comprising:

transferring the utility plan to a user; and recording, via a distributed ledger technology, user payments associated with the utility plan.

4. The method of claim 1, wherein training the trained PINN further comprises:

determining the trained PINN based on one of: the first local PINN, the second local PINN, or the global PINN, wherein the trained PINN is a federated PINN.

5. The method of claim 4, wherein upon determining that the utility data includes incomplete data or extrapolated data, the trained PINN is determined based on the first local PINN or the second local PINN.

6. The method of claim 4, wherein upon determining that the utility data does not include incomplete data or extrapolated data, the trained PINN is determined based on the global PINN.

7. The method of claim 4, wherein the global PINN is trained based on a weighted average of local PINNs such that $$\text{Global}_{LOSS} = \text{Physics}_{PDE} + \sum_{i=1}^{N} w\bar{i} * \text{Local}_{LOSS}(i),$$

where $\text{Global}_{Loss}$ represents a loss function of the global PINN, $\text{Physics}_{PDE}$ represents a physics partial differential equation, $w\bar{i}$ represents a weighted average of an $i^{th}$ local PINN, and $\text{Local}_{Loss}(i)$ represents a loss function of an $i^{th}$ PINN.

8. A system, comprising:

a processor; and memory or storage comprising an algorithm or computer instructions, which when executed by the processor, performs an operation comprising:

receiving user data;

receiving utility data;

generating, via a trained physics-informed neural network (PINN), a utility usage prediction based on the utility data, wherein training the trained PINN comprises:

training a first local PINN based on utility data of a first local environment;

training a second local PINN based on utility data of a second local environment; and training a global PINN based on the first local PINN and the second local PINN;

generating a utility plan based on the user data and the utility usage prediction, wherein the utility plan includes limits or restrictions of a utility usage; and controlling the utility usage of at least one of electricity, water, or gas based on the utility plan.

9. The system of claim 8, wherein the user data includes at least one of: a utility budget, a utility usage analytics request, a utility usage prediction request, or an optimized utility plan request;

wherein the utility data includes data from a utility system, a weather system, or a metering system;

wherein the limits or restrictions of the utility plan indicate the utility usage during a time window or during a given time of a day; and wherein the limits or restrictions of the utility plan indicate the utility usage in compliance with the utility budget.

10. The system of claim 8, the operation further comprising:

transferring the utility plan to a user; and recording, via a distributed ledger technology, user payments associated with the utility plan.

11. The system of claim 8, wherein training the trained PINN further comprises:

determining the trained PINN based on one of: the first local PINN, the second local PINN, or the global PINN, wherein the trained PINN is a federated PINN.

12. The system of claim 11, wherein upon determining that the utility data includes incomplete data or extrapolated data, the trained PINN is determined based on the first local PINN or the second local PINN.

13. The system of claim 11, wherein upon determining that the utility data does not include incomplete data or extrapolated data, the trained PINN is determined based on the global PINN.

14. The system of claim 11, wherein the global PINN is trained based on a weighted average of local PINNs such that $$\text{Global}_{LOSS} = \text{Physics}_{PDE} + \sum_{i=1}^{N} w\bar{i} * \text{Local}_{LOSS}(i),$$

where $\text{Global}_{Loss}$ represents a loss function of the global PINN, $\text{Physics}_{PDE}$ represents a physics partial differential equation, $w\bar{i}$ represents a weighted average of an $i^{th}$ local PINN, and $\text{Local}_{Loss}(i)$ represents a loss function of an $i^{th}$ PINN.

15. A non-transitory computer-readable storage medium having a computer-readable program code embodied therewith, the computer-readable program code executable by one or more computer processors to perform an operation comprising:

receiving user data;

receiving utility data;

generating, via a trained physics-informed neural network (PINN), a utility usage prediction based on the utility data, wherein training the trained PINN comprises:

training a first local PINN based on utility data of a first local environment;

training a second local PINN based on utility data of a second local environment; and training a global PINN based on the first local PINN and the second local PINN;

generating a utility plan based on the user data and the utility usage prediction, wherein the utility plan includes limits or restrictions of a utility usage; and controlling the utility usage of at least one of electricity, water, or gas based on the utility plan.

16. The computer-readable storage medium of claim 15, wherein the user data includes at least one of: a utility budget, a utility usage analytics request, a utility usage prediction request, or an optimized utility plan request;

wherein the utility data includes data from a utility system, a weather system, or a metering system;

wherein the limits or restrictions of the utility plan indicate the utility usage during a time window or during a given time of a day; and wherein the limits or restrictions of the utility plan indicate the utility usage in compliance with the utility budget.

17. The computer-readable storage medium of claim 15, wherein training the trained PINN further comprises:

determining the trained PINN based on one of: the first local PINN, the second local PINN, or the global PINN, wherein the trained PINN is a federated PINN.

18. The computer-readable storage medium of claim 17, wherein upon determining that the utility data includes incomplete data or extrapolated data, the trained PINN is determined based on the first local PINN or the second local PINN.

19. The computer-readable storage medium of claim 17, wherein upon determining that the utility data does not include incomplete data or extrapolated data, the trained PINN is determined based on the global PINN.

20. The computer-readable storage medium of claim 17, wherein the global PINN is trained based on a weighted average of local PINNs such that $$\text{Global}_{LOSS} = \text{Physics}_{PDE} + \sum_{i=1}^{N} w\bar{i} * \text{Local}_{LOSS}(i),$$

where $\text{Global}_{Loss}$ represents a loss function of the global PINN, $\text{Physics}_{PDE}$ represents a physics partial differential equation, $w\bar{i}$ represents a weighted average of an $i^{th}$ local PINN, and $\text{Local}_{Loss}(i)$ represents a loss function of an $i^{th}$ PINN.

* * * * *